(12) United States Patent
Hutchison et al.

(10) Patent No.: US 10,310,196 B2
(45) Date of Patent: Jun. 4, 2019

(54) MONOLITHIC PHYSICALLY DISPLACEABLE OPTICAL WAVEGUIDES

(71) Applicant: Intel Corporation, Santa Clara, CA (US)

(72) Inventors: David N. Hutchison, Santa Clara, CA (US); Haisheng Rong, Pleasanton, CA (US); John Heck, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/917,933

(22) PCT Filed: Dec. 3, 2013

(86) PCT No.: PCT/US2013/072865
§ 371 (c)(1),
(2) Date: Mar. 9, 2016

(87) PCT Pub. No.: WO2015/084332
PCT Pub. Date: Jun. 11, 2015

(65) Prior Publication Data
US 2016/0266331 A1    Sep. 15, 2016

(51) Int. Cl.
*G02B 6/12*       (2006.01)
*G02B 6/42*       (2006.01)
(Continued)

(52) U.S. Cl.
CPC .......... *G02B 6/422* (2013.01); *G02B 6/12002* (2013.01); *G02B 6/122* (2013.01);
(Continued)

(58) Field of Classification Search
CPC ............ G02B 6/12016; G02B 6/12002; G02B 6/12004; G02B 6/1203; G02B 6/12033;
(Continued)

(56) References Cited

U.S. PATENT DOCUMENTS 5,078,514 A * 1/1992 Valette ................. G02B 6/3508
385/16
5,261,015 A * 11/1993 Glasheen ............... G02B 6/356
385/23
(Continued)

FOREIGN PATENT DOCUMENTS

CN          1191984        9/1998
CN          1423755        6/2003
(Continued)

OTHER PUBLICATIONS

Hasegawa et al., "Athermal AWG Module with Extremely Low Temperature Dependence (<+/−5pm) of Center Wavelength using Multi-Compensating Plates", DOI: 10.1109/ECOC.2006.4801038, Aug. 2006, The Furukawa Electric Col, Ltd. (2 pages) [Can be located at: https://www.researchgate.net/publication/251838444_Athermal_AWG_Module_with_Extremely_Low_Temperature_Dependence_-5pm_ofCenter_Wavelength_using_Multi-compensating_Plates].
(Continued)

*Primary Examiner* — Michael P Mooney
(74) *Attorney, Agent, or Firm* — Green, Howard & Mughal LLP (57) ABSTRACT

A portion of an optical waveguide extending laterally within a photonic integrated circuit (PIC) chip is at least partially freed from the substrate to allow physical displacement of a released waveguide end relative to the substrate and relative to an adjacent photonic device also fabricated in the substrate. The released waveguide end may be displaced to modulate interaction between the photonic device and an optical mode propagated by the waveguide. In embodiments where the photonic device is an optical coupler, employing for example an Echelle grating or arrayed waveguide grating (AWG), mode propagation through the coupler may be modulated via physical displacement of the released wave- (Continued)

guide end. In one such embodiment, thermal sensitivity of an integrated optical wavelength division multiplexer (WDM) is reduced by displacing the released waveguide end relative to the coupler in a manner that counters a temperature dependence of the optical coupler.

25 Claims, 8 Drawing Sheets

(51) Int. Cl.
  *G02B 6/122* (2006.01)
  *G02B 6/14* (2006.01)
(52) U.S. Cl.
  CPC ....... *G02B 6/1203* (2013.01); *G02B 6/12004* (2013.01); *G02B 6/12016* (2013.01); *G02B 6/12033* (2013.01); *G02B 6/14* (2013.01); *G02B 6/4208* (2013.01); *G02B 6/4266* (2013.01)
(58) Field of Classification Search
  CPC . G02B 6/122; G02B 6/14; G02B 6/42; G02B 6/4208; G02B 6/422; G02B 6/4266
  USPC .................. 385/14, 37, 129–132, 49, 50
  See application file for complete search history.

(56) References Cited

U.S. PATENT DOCUMENTS

| | | | |
|---|---|---|---|
| 6,211,118 | B1 | 4/2001 | Hoshi |
| 6,418,249 | B1 | 7/2002 | Nakamura et al. |
| 6,493,482 | B1 | 12/2002 | Al-Hemyari et al. |
| 6,980,727 | B1 | 12/2005 | Lin et al. |
| 6,987,920 | B1 | 1/2006 | German et al. |
| 7,515,791 | B2 | 4/2009 | Fondeur |
| 8,320,721 | B2 | 11/2012 | Cevini et al. |
| 2001/0017957 | A1 | 8/2001 | Horino |
| 2002/0172466 | A1 | 11/2002 | Baumann et al. |
| 2002/0176171 | A1 | 11/2002 | Berolo et al. |
| 2003/0095737 | A1 | 5/2003 | Welch et al. |
| 2004/0017971 | A1* | 1/2004 | Johannessen ...... G02B 6/12014 385/37 |
| 2005/0018946 | A1 | 1/2005 | Tran et al. |
| 2005/0100283 | A1 | 5/2005 | Hsu et al. |
| 2009/0263075 | A1 | 10/2009 | Rhee et al. |
| 2010/0272394 | A1 | 10/2010 | Okamoto |
| 2011/0096326 | A1 | 4/2011 | Crafts et al. |
| 2012/0002918 | A1 | 1/2012 | Kawashima et al. |
| 2012/0113422 | A1 | 5/2012 | Kivioja et al. |
| 2012/0195552 | A1 | 8/2012 | Hasegawa |
| 2013/0083315 | A1 | 4/2013 | Lo et al. |
| 2013/0122537 | A1 | 5/2013 | Margalit et al. |
| 2014/0085632 | A1 | 3/2014 | Preston et al. |
| 2015/0029572 | A1* | 1/2015 | Vail .................... G02B 26/0833 359/223.1 |
| 2015/0100283 | A1 | 4/2015 | Williams |

FOREIGN PATENT DOCUMENTS

| | | |
|---|---|---|
| CN | 101368848 | 2/2009 |
| CN | 102959440 | 3/2013 |
| JP | 1998227986 | 8/1998 |
| JP | 2000147276 | 5/2000 |
| JP | 2000292636 | 10/2000 |
| JP | 2002134833 | 5/2001 |
| JP | 2001305361 A | 10/2001 |
| JP | 2003515760 | 5/2003 |
| JP | 2004309838 | 11/2004 |
| JP | 2006011443 | 1/2006 |
| JP | 2006350356 | 12/2006 |
| JP | 2008538820 | 11/2008 |
| JP | 2010164596 | 7/2010 |
| JP | 2011513773 | 4/2011 |
| JP | 2013178411 | 9/2013 |
| TW | 201142255 | 12/2011 |
| WO | 2006073229 | 7/2006 |

OTHER PUBLICATIONS

Leick et al., Athermal AWGs for Colourless WDM-PON with −40° to +70° and Underwater Operation 2005 Optical Society of America, (3 pages).
Kim et al., "Athermal AWG Multiplexer/Demultiplexer for E/C-Band WDM-PON Application", Optical Fiber Communication and Optoelectronics Conference, 2007 Asia, Oct. 17-19, 2007, DOI: 10.1109/AOE.2007.4410797pp. 330-332 (3 pages).
Legtenberg et al., "Comb-Drive Actuators for Large Displacements" MESA Research Institute, University of Twente, The Netherlands J. Micromech. Microeng. 6 (1996). pp. 320-329 (10 pages).
Cragun et al., "Linear Thermomechanical Microactuators" Mechanical Engineering Department, Brigham Young Univ. Provo, Utah MEMS—vol. 1, Mecroelectromechanical Systems—1999, pp. 181-188 (8 pages).
Sehr et al., "Fabrication and Test of Thermal Vertical Bimorph Actuators for Movement in the Wafer Plane", Department of Electronics and Computer Science, Univ of Southampton, Highfiled, Southampton, UK Institute of Physics Publishing, Journal of Micromechanics and Microengineering 11 (2001) pp. 306-310 (5 pages).
International Preliminary Report on Patentability for International Patent Application No. PCT/US13/72865 dated Jun. 16, 2016, 11 pages.
First Office Action for Japanese Patent Application No. 2016-525878 dated Mar. 14, 2017, 13 pages.
European Search Report for European Patent Application No. EP 13 89 8555, dated Jun. 29, 2017.
International Search Report & Written Opinion dated Sep. 2, 2014, for PCT Patent Application No. PCT/US13/72865.
International Search Report and Written Opinion for International Application No. PCT/US2015/032451 dated Aug. 27, 2015, 16 pages.
Notice of Allowance for U.S. Appl. No. 14/317,132 dated Jul. 14, 2016, 8 pages.
Notice of Allowance for U.S. Appl. No. 14/317,132 dated Mar. 3, 2016, 7 pages.
Notice of Allowance for U.S. Appl. No. 14/317,132 dated Nov. 6, 2015, 9 pages.
Office Action and Search Report for Taiwan Patent Application No. 104116077 dated Apr. 22, 2016, 11 pages.
Notice of Preliminary Rejection for Korean Patent Application No. 20167011602 dated Sep. 18, 2017.
Office Action for Japan Patent Application No. 2016-525878, dated Nov. 28, 2017.
Non-Final Office Action from European Patent Application No. 13898555.1 notified Oct. 15, 2018, 7 pgs.
Non-Final Office Action from Korean Patent Application No. 20167011602 notified Sep. 21, 2018, 10 pgs.
Notice of Reasons for Rejection for Japanese Patent Application No. 2016-525878 dated Aug. 7, 2018, 12 pgs.
First Office Action for Chinese Patent Application No. 201380080655.8, dated Jun. 5, 2018.
Notice of Preliminary Rejection for Korean Patent Application No. 2016-7011602, dated Mar. 23, 2018.

\* cited by examiner

MONOLITHIC PHYSICALLY DISPLACEABLE OPTICAL WAVEGUIDES

CLAIM FOR PRIORITY

This application claims priority to PCT Patent Application Serial No. PCT/US13/72865, filed on 13 Dec. 2013, titled "MONOLITHIC PHYSICALLY DISPLACEABLE OPTICAL WAVEGUIDES", and which is incorporated by reference in entirety for all purposes.

BACKGROUND

A photonic integrated circuit (PIC) includes monolithically integrated photonic devices or elements and is useful as an optical data link in applications such as optical communications and high performance computing. For mobile computing platforms too, PICs offer a promising I/O for rapidly updating or syncing a mobile device with a host device and/or cloud service. Such optical links utilize an optical I/O interface that includes an optical transmitter and/or an optical receiver including one or more optical waveguide propagating light through one or more passive or active photonic device.

PICs have advantages over optical systems built with discrete optical components due to their compact size, lower cost, and the heightened functionality and/or performance. Many integrated photonic devices however are temperature sensitive and materials that better facilitate monolithic integration often suffer from greater temperature sensitivity. For example, Silicon Photonics (SiPh) technology has clear advantages in terms of manufacturability and scalability, but is faced with the challenge of high temperature sensitivity (e.g., compared to silica, silicon has an index of refraction (RI) that is about 10 times more temperature sensitive).

An optical multiplexer (mux) and de-multiplexer (de-mux) are key components in wavelength division multiplexing (WDM) networks for optical communications and interconnect. To send multiple wavelengths (channels) down a single optical fiber, the wavelengths must be multiplexed (combined) by a mux at one end of the fiber and de-multiplexed (separated) by a de-mux at the receiving fiber end. Optical mux and de-mux elements, such as an Echelle grating or arrayed waveguide (AWG), may integrate well with other optical components like lasers and detectors to form a highly integrated monolithic PIC. However, both of these WDM elements are good examples of temperature sensitive photonic devices.

Many techniques designed to reduce PIC temperature sensitivity, such as active temperature stabilization where a heat source is provided to stabilize the temperature, disadvantageously consume additional electrical power and add system complexity. Therefore, alternatives may be advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings and are not intended to restrict the application of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. In some instances, well-known methods and devices are shown in block diagram form, rather than in detail, to avoid obscuring inventive aspects of the exemplary embodiments. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with the first and second embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

The terms "over," "under," "between," and "on" as used herein refer to a relative position of one component or material layer with respect to other components or layers where such physical relationships are noteworthy. For example in the context of material layers, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similar distinctions are to be made in the context of component assemblies.

As described in greater detail below, in embodiments at least a portion of an optical waveguide extending laterally over a substrate within a photonic integrated circuit (PIC) chip is at least partially freed from the substrate to permit physical displacement of a released waveguide end relative to the substrate and relative to an adjacent photonic device also fabricated in the substrate. The released waveguide end may be physically displaced, for example, as a function of internal film stress, and/or as a result of active actuation through an electromechanical drive, to modulate interaction between the photonic device and an optical mode propagated by the waveguide. In embodiments where the photonic device is an optical coupler, employing for example an Echelle grating or AWG mux/de-mux element, mode propagation through the coupler may be modulated via mechanical displacement of the released waveguide end so as to reposition the optical port launch point. In one such embodiment, thermal sensitivity of an integrated optical WDM element is reduced by displacing the released waveguide end relative to the coupler in a manner that counters a temperature dependence of the coupler/WDM element.

Figure 1A:
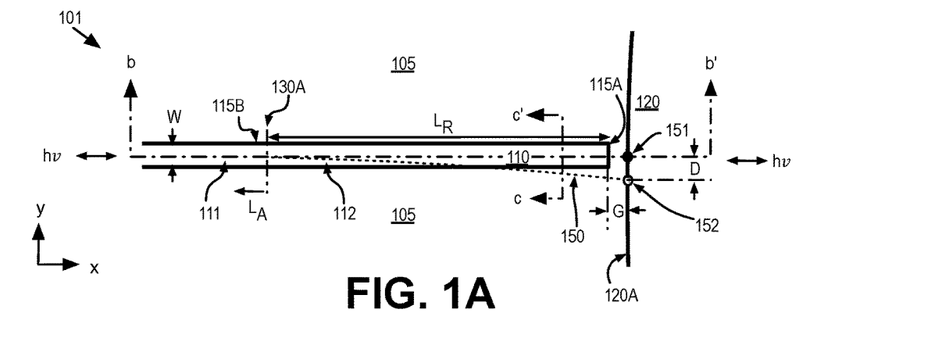
FIG. 1A is a plan view of a PIC integrating onto a single substrate a physically displaceable optical waveguide adjacent to a photonic device, in accordance with an embodiment.

In embodiments, a PIC is a monolithic device including at least an optical waveguide and a photonic device disposed over the same substrate. The optical device is optically coupled to the waveguide, with a portion of either the waveguide or optical device physically free of substrate to an extent permitting a physical displacement relative to the substrate sufficient to modulate an interaction between the photonic device and a mode propagated in the waveguide. FIG. 1A is a plan view of a PIC 101 integrating onto a single substrate 105 a physically displaceable optical waveguide 110 adjacent to a physically anchored photonic device 120, in accordance with an embodiment. Photonic device 120 is disposed over a first region of substrate 105 and may be any passive or active optical element, such as but not limited to an n-port optical coupler, optical modulator, photodetector, or laser. Optical waveguide 110 is disposed over a second region of substrate 105 and is generally planar, in the plane of substrate 105 and co-planar (i.e., in the same plane) with photonic device 120. Strip or rib sidewalls 115B define a transverse or lateral width W of waveguide 110. The width W may vary with material system and wavelength, but for one exemplary silicon embodiment, waveguide width W is advantageously between 3 µm and 6 µm for propagated light having a 1310 nm center wavelength. A similar range is also applicable to the z-height of waveguide 110.

Optical waveguide 110 is of a material having sufficient index contrast with surrounding materials to guide by total internal reflection (TIR) electromagnetic waves in the optical spectrum (hv) along a longitudinal waveguide length L. In embodiments, optical waveguide 110 includes at least one anchored waveguide portion 111 that is physically anchored to substrate 105 along an anchored longitudinal length $L_A$, and at least one released waveguide portion 112 that is physically released from substrate 105 along a released longitudinal length $L_R$.

As further illustrated in FIG. 1A, released waveguide portion 112 is also physically separated from photonic device 120 with a waveguide end facet 115A proximate to photonic device 120. Waveguide end facet 115A is separated from a photonic device end facet 120A by a free-space gap G. Waveguide 110 is optically coupled to photonic device 120 across the free-space gap G with an optical mode therefore to traverse the free-space gap G and couple into (or out of) photonic device 120 at a launch point 151. Launch point 151 can be physically displaced through a displacement of released waveguide portion 112 in one or more dimensions relative to substrate 105. In advantageous embodiments, an interaction between photonic device 120 and a mode propagated in waveguide 110 can be modulated by controlling physical displacement of released waveguide portion 112. In the exemplary embodiment where optical waveguide 110 is cantilevered from a fixed anchor point on substrate 105 distal from photonic device 120, launch point 151 can be physically displaced through elastic deflection of released waveguide portion 112 in one or more dimensions relative to substrate 105.

In an embodiment, a released portion of an optical waveguide end is laterally displaceable within the xy plane of the substrate from an anchored portion of the waveguide. As further shown in FIG. 1A, a longitudinal axis of anchored waveguide portion 111 is aligned with the cross-section plane b-b'. Released waveguide portion 112 is of a length sufficient based on the modulus of elasticity of the waveguide material and area moment of inertia of waveguide to achieve an angle of deflection from anchor point 130A such that a longitudinal axis of released waveguide portion 112 follows dashed line 150 and launch point 151 is laterally displaced by end facet displacement distance D, to launch point 152.

Figure 1B:
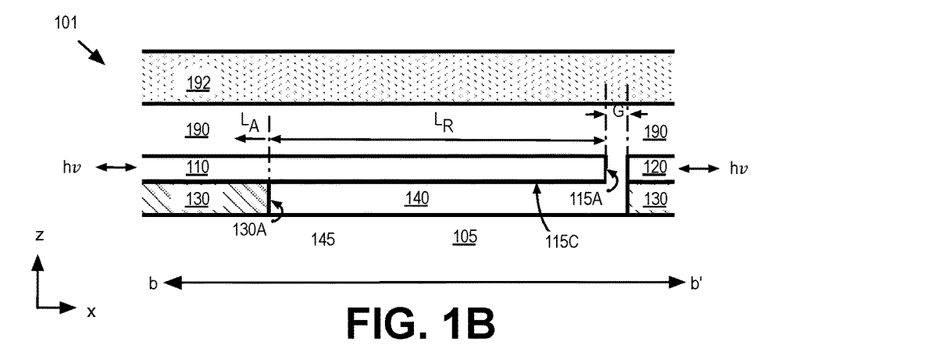
FIG. 1B is a cross-sectional view of the PIC depicted in FIG. 1A along the b-b' line shown in FIG. 1A, in accordance with an embodiment.
Figure 1C:
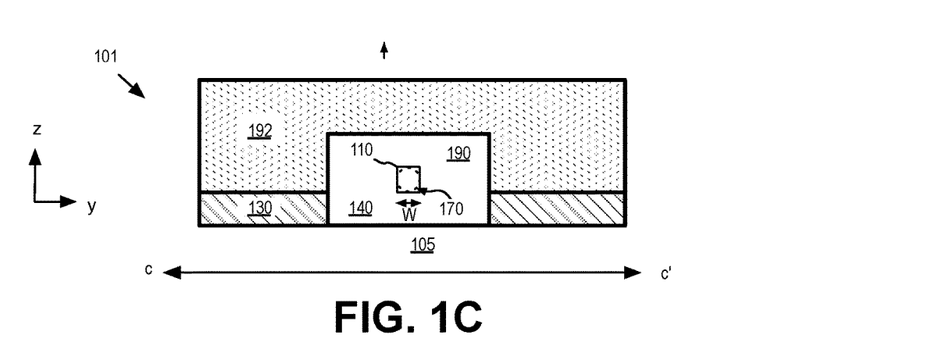
FIG. 1C is a cross-sectional view of the PIC depicted in FIG. 1A along the c-c' line shown in FIG. 1A, in accordance with an embodiment.

FIG. 1B is a cross-sectional view of PIC 101 along the b-b' line shown in FIG. 1A, in accordance with an embodiment. As shown, optical waveguide 110 comprises a device layer disposed over substrate 105. Substrate 105, may be any substrate known in the art to be suitable for forming an IC, such as, but not limited to, a semiconductor substrate, a semiconductor-on-insulator (SOI) substrate, an insulator substrate (e.g., sapphire), or the like, and/or combinations thereof. In advantageous embodiments, optical waveguide 110 is a crystalline (e.g., substantially monocrystalline) semiconductor layer, such as silicon. Alternative semiconductors, such as germanium, SiGe, as well as other compound semiconductors, such as InP, are also possible. Optical waveguide 110 is separated from substrate 105 by an intervening material 130 of sufficiently high index contrast with the waveguide material. In the exemplary embodiment where optical waveguide 110 and substrate 105 are both crystalline silicon, intervening material 130 is silica. In one such embodiment, where substrate 105 is a silicon SOI substrate, a silicon optical waveguide 110 is patterned into the silicon device layer of substrate 105. Photonic device 120 is planar with waveguide 110 (i.e., having the same z-height) and is within the same device layer as waveguide 110. As further illustrated in FIG. 1B, a bottom void 140 having the released longitudinal length $L_R$ is below waveguide 110 and proximate to photonic device 120 with the intervening material layer 130 present as the anchor along the anchored longitudinal length $L_A$. Similarly, a top void 190 is present over waveguide 110 along at least the released longitudinal length $L_R$, and may optionally extend further. Disposed over waveguide 110 is a shell 192 of any material known in the art to provide suitable protection for monolithic released structures of this type. FIG. 1C is a cross-sectional view of the PIC 101 along the c-c' line shown in FIG. 1A, and further illustrates how the waveguide 110 is fully released from surrounding materials. As also depicted in FIG. 1C, waveguide 110 contains an optical mode 170 in the z and y dimensions as it propagates in the x dimension along the released longitudinal length $L_R$.

Figure 2:
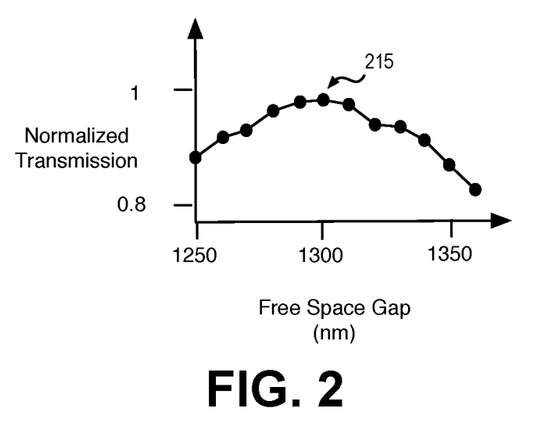
FIG. 2 is a graph illustrating an effect of free-space gap dimension on optical mode transmission, in accordance with an embodiment.

With waveguide 110 physically detached from photonic device 120, it is advantageous to design the dimension of free-space gap G and/or design end facets 115A, 120A to maximize the optical transmission there between. While optical coupling between waveguide 110 and photonic device 120 can be expected to decline with larger free-space gap G, in certain advantageous embodiments, an end facet of the released second waveguide length and an end facet of an adjacent optical device form a Fabry-Perot (FP) cavity. Peaks of high transmission corresponding to resonant wavelengths can be achieved by dimensioning a cut between waveguide end facet 115A and photonic device end facet 120A to provide the FP cavity. This effect is shown in FIG. 2, which is a graph modeling an effect of free-space gap dimension on optical mode transmission across the gap in an exemplary embodiment where 1310 nm wavelength light is propagated between a 5 μm×5 μm silicon waveguide 110 and a silicon photonic device 120. At point 215, transmission reaches at least 99% where the free-space gap G is equal to the center wavelength (i.e., 1310 nm), with transmission rolling off to about 90% at ±50 nm. If more relaxed patterning/fabrication rules are desired, acceptable transmission levels may also be achieved for any free-space gap G having an integer multiple of half the wavelength (λ/2). For example, assuming the 5 μm×5 μm silicon waveguide 110 and a silicon photonic device 120 as modeled in FIG. 2, transmission of the 1310 nm center wavelength across a free-space gap G of 1965 nm (3/2λ) is at least 97%.

Figure 3A:
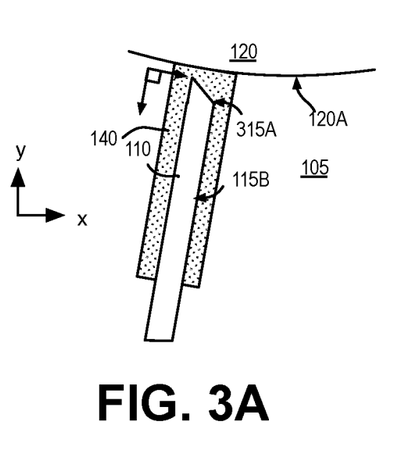
FIGS. 3A, 3B are plan views illustrating back-reflectance reduction for a released end of a displaceable optical waveguide, in accordance with an embodiment.
Figure 3B:
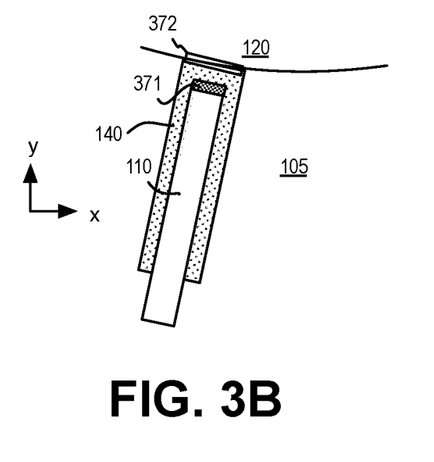

In alternative embodiments where an FP cavity is not provided between the adjacent waveguide and photonic device end facets, transmission can be improved by reducing the dimension of free-space gap G. In one advantageous embodiment, the free-space gap G is no more than approximately λ/2 (e.g., 660 nm). A gap of this size corresponds to less than a 8:1 aspect ratio for the exemplary 5 μm tall silicon waveguide, which is readily achievable with contemporary plasma etch systems. In embodiments, the waveguide end facet and/or adjacent photonic device facet is clad with an anti-reflective coating, and/or at least one of these facets is angled non-orthogonally to reduce back-reflection and/or increase spectral flatness. FIGS. 3A and 3B are plan views illustrating an end of a displaceable optical waveguide with back-reflection reduction in accordance with embodiments. As shown in FIG. 3A, an end portion of waveguide 110 extending over void 140 has a laterally-angled end facet 415 that is non-orthogonal to waveguide lateral sidewall 115B (or non-orthogonal to the longitudinal axis of waveguide 110). Non-orthogonal angling of a waveguide end facet in the z-dimension (i.e., end facet slope) is also possible, but such embodiments lack the lithographic patterning simplicity of laterally-angled end facets. Photonic device end facet 120A may also be angled, for example over the z-dimension.

In further embodiments, as shown in FIG. 3B, waveguide 110 includes an end facet clad with an anti-reflective coating (ARC) 371. Any conventional ARC may be utilized based on the chosen wavelength and material system, and embodiments are not limited in this respect. Exemplary materials include one or more layers of organic or inorganic (Si-based) materials. In further embodiments, a photonic device end facet adjacent to the released waveguide end facet is clad with an ARC. As illustrated in FIG. 3B for example, photonic device 120 includes an ARC 372 adjacent to waveguide 110. In advantageous embodiments, ARC 371 and 372 are of the same material. In further embodiments, both angling of the end facet as shown in FIG. 3A and ARC coating of the end facet as shown in FIG. 3B may be combined.

In embodiments, a released waveguide portion is optically coupled into an n-port optical coupler and traversal of an optical mode through the coupler is dependent on the physical position of an end of the released waveguide portion relative to the coupler. For WDM embodiments, the optical coupler may be a 1-to-n coupler or a star coupler having any number of input and output ports. At least one optical waveguide functioning as a coupler port has a released waveguide portion. Physical displacement of the released waveguide end relative to the substrate and optical coupler may then affect traversal of light through the coupler, for example changing a propagation lengths and/or diffraction or reflection angles within the coupler. For example, a center frequency associated with one or more of the coupler ports may be varied as a function of displacement of the released waveguide end. This capability may be directed toward a number of PIC designs and applications. In a first embodiment, described in further detail below in the context of a WDM, coupler optical parameter variation is compensated by physical displacement of a released waveguide. By controlling displacement of the released waveguide, the mux and de-mux functional space may be increased. It is noted however, a similar strategy may be applied more generally to any photonic element subject to optical parameter instability.

Figure 4A:
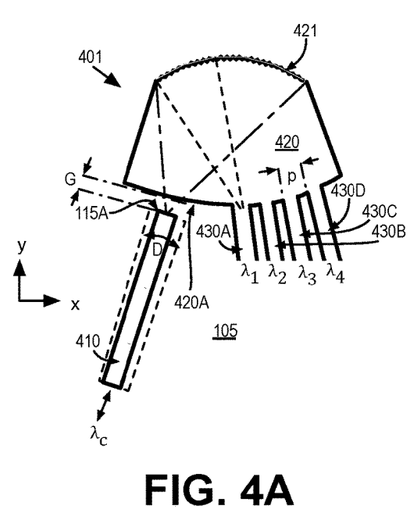
FIG. 4A is a plan view of an Echelle grating mux/de-mux with a single displaceable port, in accordance with an embodiment.

FIG. 4A is a plan view of an Echelle grating WDM 401 with a single displaceable waveguide 410, in accordance with a four-channel embodiment. As illustrated, displaceable waveguide port 410 is at least partially physically free of substrate 105, for example substantially as was illustrated in FIGS. 1A-1C. Waveguide end facet 115A is at least laterally movable over the distance D and separated from coupler end facet 420A by free-space gap G. Waveguide port 410 and optical coupler 420 may each be of silicon, for example having the material stack structure described in the context of FIGS. 1B and 1C. Optical coupler 420 includes Echelle grating 421 and a plurality of physically anchored or fixed waveguide ports 430A, 430B, 430C, and 430D. Although four channels are illustrated, more or fewer ports may be provided. During WDM de-mux operation, an optical mode of light having a center frequency of $\lambda_c$ (e.g., 1310 nm) propagates between displaceable waveguide port 410 and coupler 420, through waveguide end facet 115, traversing the free-space gap G, through coupler end facet 420A, and reflecting at Echelle grating 421. Constructively interfering wavelengths propagate to respective waveguide ports (e.g., $\lambda_1$ at 430A, $\lambda_2$ at 430B, etc. with standardized 20 nm channel spacing). Conversely, during mux operation, light of various channel center frequencies (e.g., $\lambda_1$=1350 nm) traverses through coupler 420 to coupler end facet 420A, traverses the free-space gap G, and enters displaceable waveguide port 410. The operative center frequency of WDM 401 is associated with positions of the fixed waveguide ports 430A-430D and a launch point of the coupler, as well as parameters of grating 421 and refractive index of coupler 420. Where coupler 420 is of silicon and coupler RI changes considerably with temperature, a significant center frequency (wavelength) shift may occur if the PIC temperature varies during operation.

In certain optical coupler embodiments, a displaceable waveguide port includes a released waveguide portion that is free to undergo a displacement relative to the substrate (and relative to the coupler) sufficient to vary a coupling of an optical mode among one or more other ports of the coupler. In certain such embodiments, a released portion of a first waveguide is free to undergo elastic deflection sufficient to vary a coupling of the optical mode among second waveguides. In embodiments where coupler RI is temperature dependent, the released waveguide portion may undergo a degree of deflection relative to substrate 105 and coupler 420 to at least partially compensate that temperature dependence, rendering the center frequency of WDM 401 more thermally insensitive, or "athermalized." Assuming an operating temperature range of 40° C. (e.g., ±20° C.), and a WDM channel spacing Δλ of 20 nm, if ports 430A-430D have a pitch p of approximately 20 μm, a silicon coupler 420 may experience a center frequency shift of approximately 10 GHz/° C. Thus, to athermalize over the 40° range, output wavelength(s) need to tunable by δλ of approximately 2.4 nm, which corresponds to 2.4 μm of physical shift in the coupler launch point $$\left(\delta\lambda \frac{p}{\Delta\lambda}\right).$$

With a sufficiently long released length, waveguide port 410 may be readily displaced over distances of a few microns, and indeed even over tens of microns, using passive and/or active micro-electro-mechanical system (MEMS) actuator techniques, such as those described further below.

Figure 4B:
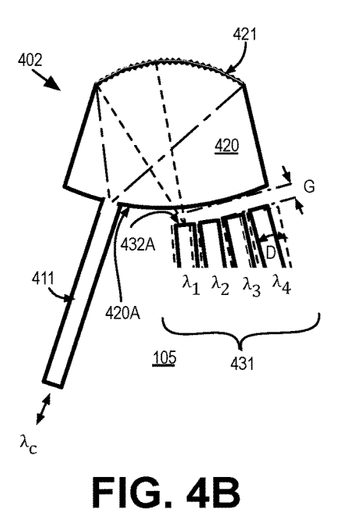
FIG. 4B is a plan view of an Echelle grating mux/de-mux with multiple displaceable ports, in accordance with an embodiment.

Notably, embodiments are not limited to one displaceable waveguide and more than one waveguide within a PIC may be released and physically displaced. FIG. 4B for example, is a plan view of an Echelle grating WDM 402 with multiple displaceable optical waveguide ports 431, in accordance with an embodiment. In this embodiment, each of ports 431 is displaceable relative to substrate 105 and coupler 420 over the displacement distance D while waveguide port 411 is anchored to substrate 105. As was described for the single displaceable waveguide port illustrated in FIG. 4A, each optical waveguide port 431 has an end facet 432A separated from coupler face 420A by a free-space gap G. WDM 402 may be temperature compensated for example, by moving ports 431 in unison over the displacement distance D while maintaining a designed pitch.

In further embodiments, all waveguide ports of an optical coupler are displaceable relative to a substrate on which the coupler is anchored. For example, the embodiments illustrated in FIGS. 4A and 4B may be combined such that waveguide port 410, as well as each of waveguide ports 431, is displaceable. In such an embodiment, waveguide ports 431 may be physically displaced as a group independently of a waveguide port 410, for example to achieve a total effective displacement distance D beyond what may be achieved at only one end of the coupler. In still other embodiments, even the optical coupler may be released from the substrate so as to permit displacement relative to the substrate, in which case waveguide ports of the coupler may also be released from the substrate, or completely anchored to the substrate.

Displaceable waveguides may be similarly coupled to optical couplers employing other WDM elements. For example, in the embodiment illustrated in FIG. 5 arrayed waveguide grating (AWG) WDM 501 includes physically displaceable waveguide port 410 optically coupled into a first (e.g., input) coupler 522. AWG 524 optically couples first coupler 522 with a second (e.g., output) coupler 523. A variation in path lengths within AWG 524 results in wavelength-dependent constructive interference at waveguide ports 430. Displacement of waveguide port 410 relative to substrate 105 again changes the launch position of coupler 522 (which is anchored to substrate 105 in this example).

Figure 5:
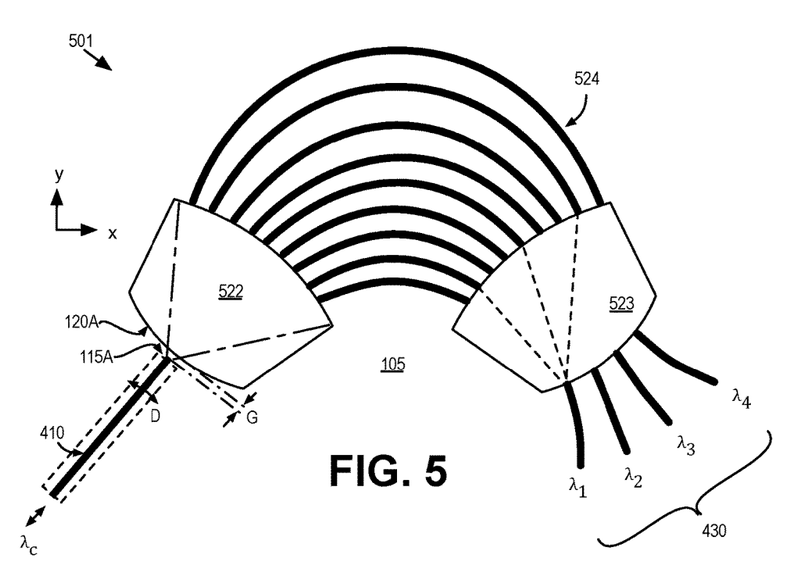
FIG. 5 is a plan view of a AWG mux/de-mux with a single displaceable port, in accordance with an embodiment.

For those embodiments where one or more optical parameter (e.g., RI) of AWG WDM 501 has a temperature dependence, physical waveguide port displacement may enable athermal operation over some predetermined temperature range as dependent on various device design parameters.

Figure 6A:
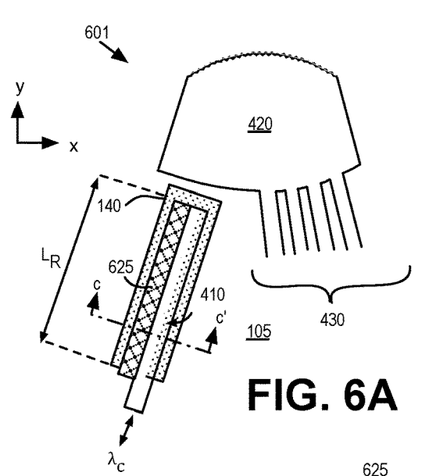
FIG. 6A is a plan view of an Echelle grating mux/de-mux with a passively displaceable port, in accordance with an embodiment.

In embodiments, a displaceable optical waveguide is to be passively displaced relative to the substrate. Passive displacement may be through non-uniform or asymmetric stress internal to the released length of the waveguide itself and/or of a cladding on the released waveguide length. A released member strains predictably to relax stress in the released member. For athermalization embodiments, strain c in the released waveguide and/or cladding there about can be engineered to have a desired dependence on temperature $$\frac{\delta \varepsilon}{\delta T}$$

that compensates wavelength dependence $$\frac{\delta \lambda}{\delta T}$$

of the optical coupler so as to cancel the thermal drift. FIG. 6A is a plan view of an Echelle grating mux/de-mux 601 with a passively displaceable waveguide 410 optically coupled with coupler 420, in accordance with an embodiment. WDM 601 may include all the attributes and features of WDM 401 previously described. As further shown, waveguide 410, being of a first material, is asymmetrically clad with one or more compositionally distinct cladding material 625 to induce a deflection in a released waveguide length $L_R$ as a function of the first and second material temperature. Cladding material 625 may have a volumetric coefficient of thermal expansion (CTE) that differs from that of the waveguide material. For example, where waveguide 410 is silicon, cladding material 625 may be of a material other than silicon, such as, but not limited to aluminum, or another metal having a CTE sufficiently different than silicon. As further illustrated in FIG. 6A, both waveguide 410 and cladding material 625 are released from substrate 105 with etched void 140 extending below their lateral widths.

Figure 6B:
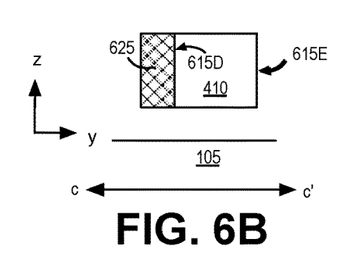
FIGS. 6B and 6C are cross-sectional views of the passively displaceable waveguide depicted in FIG. 6A along the c-c' line shown in FIG. 6A, in accordance with an embodiment.

FIG. 6B is cross-sectional view of passively displaceable waveguide 410 along the c-c' line shown in FIG. 6A, in accordance with a laterally displaceable waveguide embodiment. For such embodiments, a lateral sidewall of at least a portion of a released waveguide length is covered with cladding material 625 to a greater extent than an opposite sidewall. More specifically a first lateral waveguide sidewall 615D has significantly greater thickness of cladding material 625 than does opposing sidewall 615E. Many techniques for such anisotropic deposition are known and embodiments are not limited in this respect. Notably, with the additional constraint that an optical mode be propagated through waveguide 410, in advantageous embodiments an asymmetric cladding is a multi-layered stack. In the exemplary embodiment illustrated in FIG. 6C, the cladding material 625 includes an outer cladding material 629 separated from optical waveguide 410 by an intervening inner cladding material 627. Inner cladding material 627 is to provide an index contrast with the waveguide material and reduce scattering of optical mode 170 that might occur if outer cladding material 629 was disposed in direct contact with waveguide 410. In one such embodiment where waveguide 410 is silicon, inner cladding 627 may be silicon dioxide or silicon nitride with outer cladding 627 again being aluminum, or other suitable metal. Silicon nitride is particularly advantageous as the inner cladding 627 where waveguide 410 is a silicon device layer of an SOI substrate because an isotropic silica etch may then be utilized to selectively release a cladded waveguide structure without detriment to the multi-layered cladding.

Figure 6C:
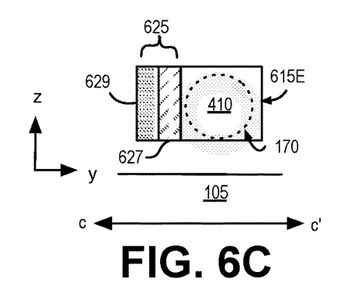

To achieve athermal operation over an exemplary 40° C. range in the Echelle grating WDM described above as having a 1310 nm $\lambda_c$ with a channel spacing $\Delta\lambda$ of 20 nm and port pitch p of approximately 20 µm, a waveguide end facet displacement rate of approximately 0.6 µm/° C. is needed. This rate of deflection may be achieved through passive displacement of a silicon waveguide having a 5 µm width W and 5 µm z-height, for example with a silicon nitride inner cladding 627 that is approximately a 0.5 µm thick and an aluminum outer cladding 629 that is approximately 2 µm thick disposed along a released longitudinal length $L_R$ of 200-250 µm.

Figure 7A:
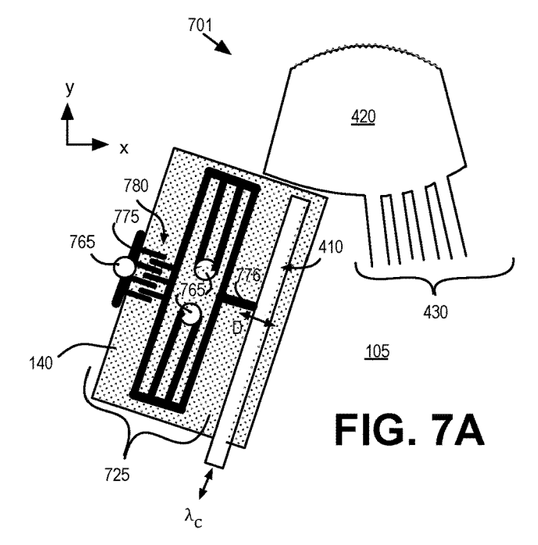
FIG. 7A is a plan view of an Echelle grating mux/de-mux with an actively displaceable port, in accordance with an embodiment.

In embodiments, a displaceable optical waveguide is to be actively displaced relative to the substrate. Active displacement may be through a microelectromechanical actuator disposed over the substrate and mechanically or electrically coupled to the optical waveguide. FIG. 7A is a plan view of an Echelle grating WDM 701 with an actively displaceable waveguide 410, in accordance with an embodiment. WDM 701 may include all the attributes and features of WDM 401 previously described. WDM 701 further includes MEMS actuator 725, which includes a moveable shuttle 776 that is physically coupled to a released portion of waveguide 410. Shuttle 774 is free (e.g., released) from substrate 101 aside from select anchor points 765 with lateral spring couplers disposed there between. As shown in FIG. 7A, etched void 140 extends under released regions of shuttle 747 and waveguide 410. Shuttle 774 further includes movable capacitive drive members 780 configured to electrostatically couple with corresponding immobile capacitive drive members anchored to substrate 105. While actuator 725 is exemplified as an electrostatic comb drive because such MEMS actuators are known to readily achieve lateral shuttle displacements of microns and even tens of microns, other actuator designs are also possible (e.g., employing variable capacitive gaps or even inductive drives).

Figure 7B:
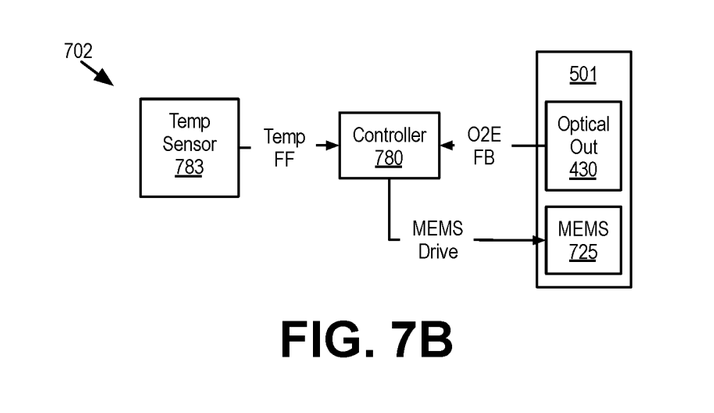
FIG. 7B is a function block diagram of a MEMS-based optical waveguide actuation system, in accordance with an embodiment.

For a MEMS actuator, for example including released capacitive drive member separated by a distance small enough to electrostatically couple to released capacitive members as a function of an applied drive voltage, the drive voltage may be actively modified in real time during operation of WDM 701, for example to vary coupling of an optical mode among waveguides 230. FIG. 7B is a function block diagram of a MEMS-based optical waveguide actuation system 702, in accordance with an exemplary embodiment athermalizing WDM 701 over some temperature range (e.g., the 40° C. range describe for WDM 201). System 702 includes a temperature sensor 783, which for example may be integrated onto substrate 105, along with WDM 701. Output from temperature sensor 783 is input into a controller 780, for example as part of a feed forward control loop. Based on at least the temperature, controller 780 outputs a MEMS actuator drive signal (e.g., voltage level) to MEMS actuator 725, for example to compensate a known optical coupler wavelength shift associated with the temperature. MEMS actuator 725 displaces waveguide 710 based on the MEMS actuator drive signal, thereby repositioning the mode launch position of the coupler. In further embodiments, system 702 may further include a feedback control loop between WDM 701 and controller 780. For example, an optical-to-electrical convertor may communicatively couple an optical output of waveguide ports 430 with controller 780.

In further embodiments, the physical displacement of a waveguide as described above may be employed in monolithic optical filter designs. For example, independent of thermal drift, the ability to displace a PIC waveguide with the structures above may be used to modulate the pass band of a monolithic optical filter. A MEMS actuator may be driven with the system 702, for example, with the control based on any arbitrary command signal input that is to be transduced into the actuator drive signal required to shift the optical filter pass band from a first center wavelength associated with a first waveguide physical position to a second center wavelength associated with a second waveguide physical position. Hence, while many structures and techniques have been described above in the context of optical parameter drift compensation (e.g., athermal WDM operation), the same physical-optical transducer architecture that makes such compensation feasible is readily adapted to other PIC applications.

Figure 8A:
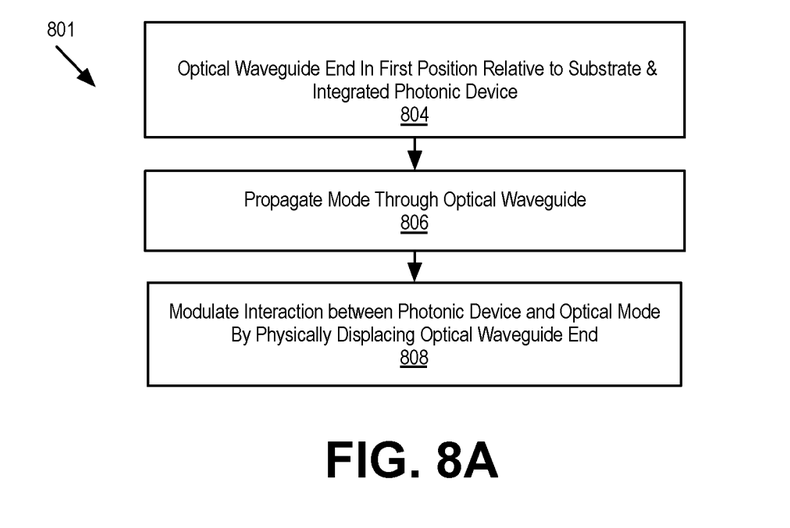
FIG. 8A is a flow diagram illustrating a method of operating a PIC including a monolithic physically displaceable optical waveguide and an adjacent photonic device, in accordance with an embodiment.

FIG. 8A is a flow diagram illustrating a method 801 of operating a PIC including a monolithic physically displaceable optical waveguide and an adjacent photonic device, in accordance with an embodiment. Method 801 begins at operation 804 with the optical waveguide end in a first position relative to a substrate and relative to a photonic device integrated onto the substrate. At operation 806, an optical mode is propagated through the optical waveguide while the waveguide is in the first position. The mode traverses a free-space gap and interacts with the photonic device in a first manner. For example, light of a first center wavelength couples into the photonic device and traverses the photonic device along a first path associated with a first launch point and a first destination, such as a first output waveguide port. At operation 808, the interaction between the photonic device and optical mode is modulated by physically displacing the optical waveguide to a second position relative to the substrate and to the photonic device. In this second position, the optical mode propagated through the waveguide traverses the free-space gap and interacts with the photonic device in a second manner. For example, light of the first center wavelength coupled into the photonic device traverses the photonic device along a second path associated with a second launch point. Depending on the state of the photonic device, the second path may either be further associated with the first destination, or a second destination, such as a second output waveguide port.

Figure 8B:
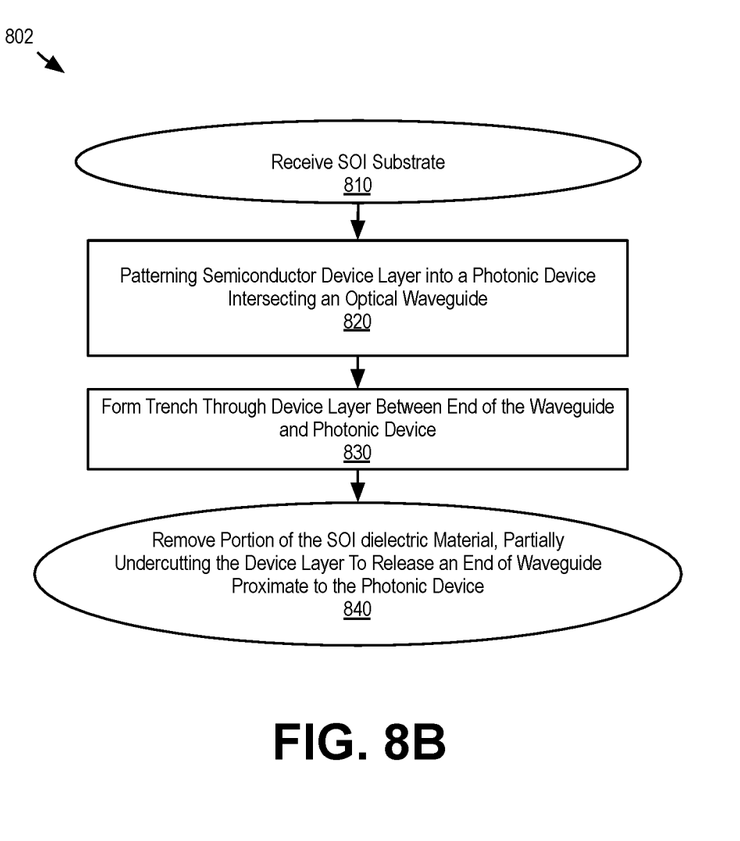
FIG. 8B is a flow diagram illustrating a method of fabricating a PIC including a monolithic physically displaceable optical waveguide and an adjacent photonic device, in accordance with an embodiment.

FIG. 8B is a flow diagram illustrating a method 802 of fabricating a PIC including a monolithic physically displaceable optical waveguide and an adjacent photonic device. Method 802 may be performed to form features described above in the exemplary WDM 401, 501, 601, and 701 structures. Method 802 begins with receiving a SOI substrate, such as a silicon SOI substrate, at operation 801. At operation 820 a semiconductor device layer is patterned into a photonic device, such as an optical coupler, interesting an optical waveguide also patterned into the semiconductor device layer (either concurrently with the photonic device, or before photonic device patterning, or after photonic device patterning). The photonic device may be patterned with any conventional lithographic and anisotropic etch process.

At operation 830, a trench is formed through the semiconductor device layer between an end of the waveguide and the photonic device. The trench formation may be performed concurrently with one or more of the waveguide patterning of the photonic device (i.e., with a same etch mask), or may be performed after patterning of the waveguide and photonic device as a separate masked etch. At operation 840 a portion of the SOI dielectric layer is removed (etched), partially undercutting the device layer to release an end of the waveguide proximate to the photonic device. In an exemplary embodiment, the undercutting etch operation 140 is performed with a mask exposing an end length of the waveguide proximate to the trench etched at operation 830, the mask opening overlapping the trench. In further embodiments, method 801 includes fabricating a structure to deflect the released waveguide passively and/or actively. In one embodiment, a material with a CTE different than that of the waveguide is deposited asymmetrically over the waveguide after it is patterned. In one such embodiment, a metal is deposited directionally to be thicker on one lateral sidewall of the waveguide than another. In another embodiment, a dielectric layer is deposited between the metal layer and the waveguide lateral sidewall. In another embodiment, the semiconductor device layer is further patterned into MEMS actuator physically coupled to the waveguide, for example with a same mask used to pattern the waveguide, and/or photonic device. In further embodiments, at least a portion of the MEMs actuator is released at operation 840 concurrently with release of the waveguide end facet. In further embodiments, a passivation layer is deposited over the waveguide and photonic device prior to the release operation 840 with the release operation 840 selective to the passivation layer to form a shell encapsulating the released waveguide end.

Figure 9:
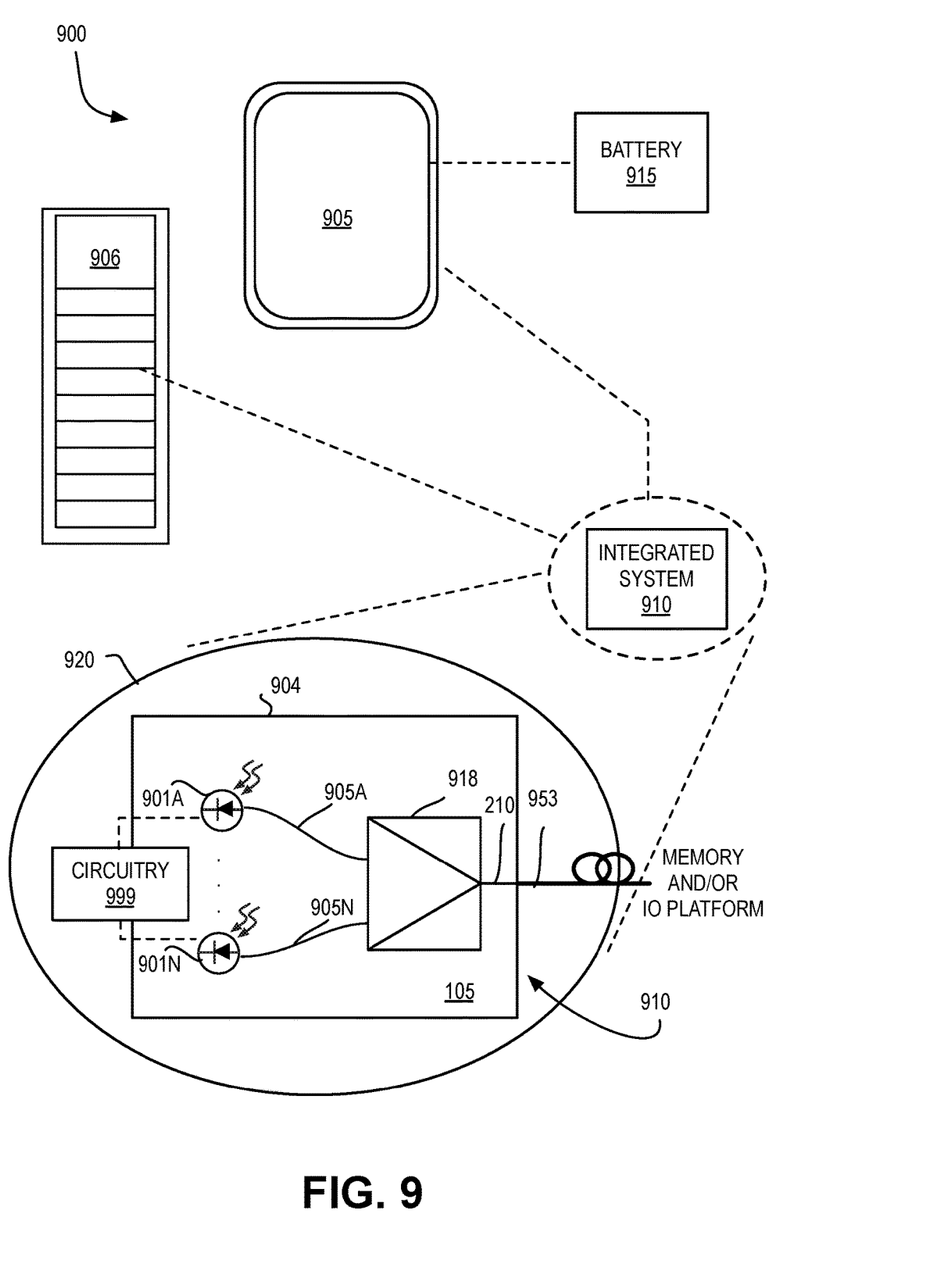
FIG. 9 illustrates a mobile computing platform and a data server machine employing an optical receiver module including a PIC having an athermal WDM receiver, in accordance with an embodiment.

FIG. 9 illustrates a mobile computing platform and a data server machine employing an optical receiver module including a PIC having a monolithic WDM receiver with a physically displaceable input waveguide, in accordance with embodiments. Server machine 906 may be any commercial server, for example including any number of high performance computing platforms disposed within a rack and networked together for electronic data processing, which in the exemplary embodiment includes integrated system 910. Mobile computing platform 905 may be any portable device configured for each of electronic data display, electronic data processing, wireless electronic data transmission, or the like. For example, mobile computing platform 905 may be any of a tablet, a smart phone, laptop computer, etc., and may include a display screen (e.g., a capacitive, inductive, resistive, touchscreen), a chip-level or package-level integrated system 910, and a battery 915.

Whether disposed within integrated system 910, further illustrated in expanded view 920, or as a stand-alone packaged chip, packaged monolithic PIC 904 includes a physically displaceable input waveguide in accordance with embodiments. In further embodiments, the displaceable waveguide is displaceable as a function of temperature to provide athermal WDM operation over a temperature range of at least 20° C., and advantageously approximately 40° C., or more. Optical wire 953 inputs a single optical beam into a monolithically integrated optical waveguide 210, for example by top-side coupling or edge coupling. Selected wavelengths are then separated with optical de-multiplexer 918 as a function of physical position of a released end of optical waveguide 210 to output to a plurality of output optical waveguides 905A-905N also disposed on substrate 105. Output optical waveguides 905A-905N are each further coupled into a low voltage photodetectors 901A-901N, each of which includes an MSM or p-i-n photodiode structure, for example. Photodetectors 901A-901N are in turn electrically coupled to downstream integrated circuitry 999, which may for example further include a voltage supply and sense circuitry. In certain embodiments, voltage supply and sense circuitry is implemented with CMOS transistors also disposed on substrate 105 and powered at a voltage level no less than that at which the photodetectors are operated. In embodiments where photodetectors 901A-901N employ Ge APD architectures described herein, both the photodetectors 901A-901N and circuitry 999 are powered at a same operating voltage (e.g., no more than 3.3V). In embodiments, de-multiplexer 918 includes one or more of the features described for one or more embodiments of Echelle grating WDM 201, or 501, or AWG WDM 301, etc. as described elsewhere herein.

Figure 10:
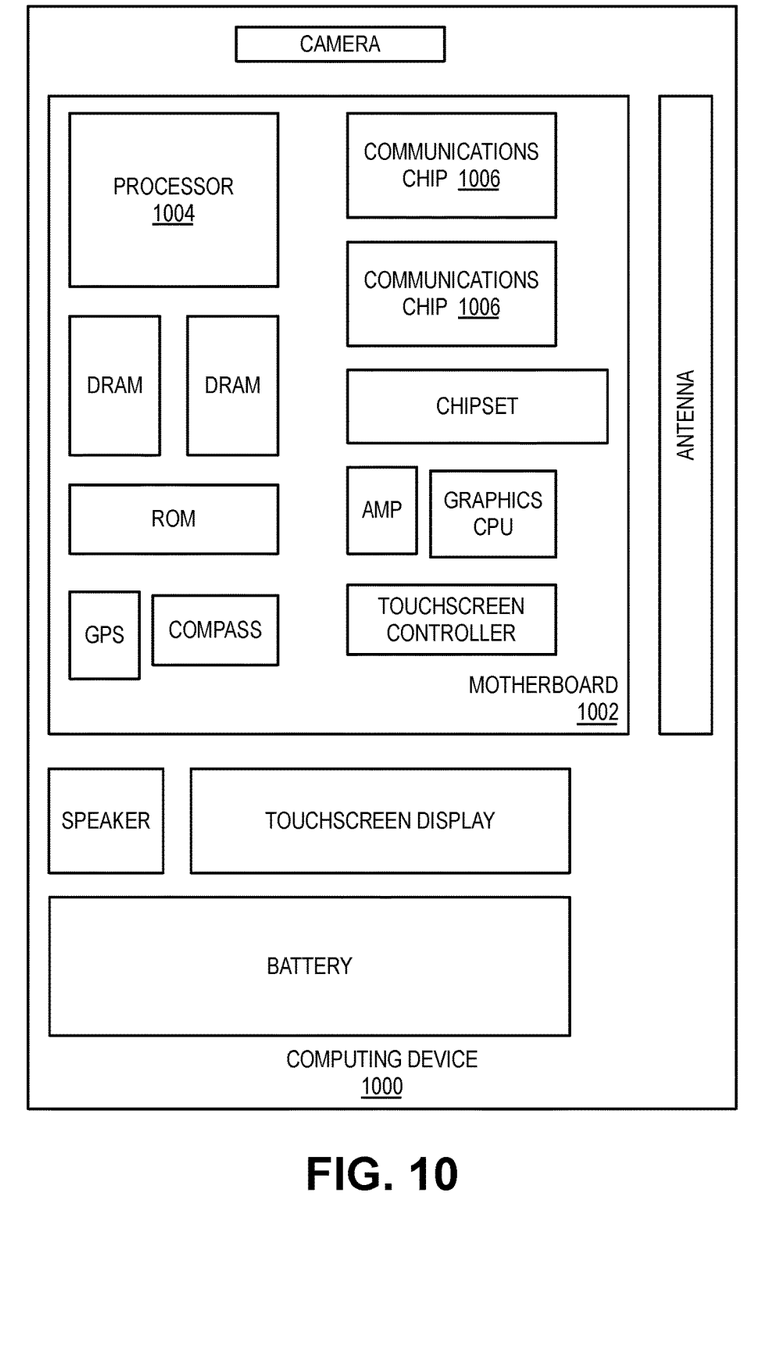
FIG. 10 is a functional block diagram of an electronic computing device, in accordance with an embodiment.

FIG. 10 is a functional block diagram of a computing device 1000, arranged in accordance with at least some implementations of the present disclosure. Computing device 1000 may be found inside platform 1005 or server machine 1006, for example, and further includes a motherboard 1002 hosting a number of components, such as but not limited to a processor 1004 (e.g., an applications processor), which may incorporate local inter-level interconnects as discussed herein, and at least one communication chip 1006. In embodiments, at least one of the processor 1004 one or more communication chips 1006, or the like. Processor 1004 may be physically and/or electrically coupled to motherboard 1002. In some examples, processor 1004 includes an integrated circuit die packaged within the processor 1004. In general, the term "processor" or "microprocessor" may refer to any device or portion of a device that processes electronic data from registers and/or memory to transform that electronic data into other electronic data that may be stored in registers and/or memory.

In various examples, one or more communication chips 1006 may also be physically and/or electrically coupled to the motherboard 1002. In further implementations, communication chips 1006 may be part of processor 1004. Depending on its applications, computing device 1000 may include other components that may or may not be physically and electrically coupled to motherboard 1002. These other components include, but are not limited to, volatile memory (e.g., DRAM), non-volatile memory (e.g., ROM), flash memory, a graphics processor, a digital signal processor, a crypto processor, a chipset, an antenna, touchscreen display, touchscreen controller, battery, audio codec, video codec, power amplifier, global positioning system (GPS) device, compass, accelerometer, gyroscope, speaker, camera, and mass storage device (such as hard disk drive, solid state drive (SSD), compact disk (CD), digital versatile disk (DVD), and so forth), or the like.

Communication chips 1006 may enable wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communication chips 1006 may implement any of a number of wireless standards or protocols, including but not limited to those described elsewhere herein. As discussed, computing device 1000 may include a plurality of communication chips 1006. For example, a first communication chip may be dedicated to shorter-range wireless communications, such as Wi-Fi and Bluetooth, and a second communication chip may be dedicated to longer-range wireless communications such as GPS, EDGE, GPRS, CDMA, WiMAX, LTE, Ev-DO, and others.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

In one or more first embodiments, a monolithic photonic integrated circuit (PIC) includes a substrate, a photonic device disposed over a first region of the substrate, and an optical waveguide disposed over a second region of the substrate. A first portion of the waveguide distal from the photonic device is physically anchored to the substrate, and a second portion of the waveguide proximate to the photonic device is physically released from the substrate and from the photonic device.

In furtherance of the one or more first embodiment, the photonic device comprises an optical coupler and traversal of the mode through the coupler is dependent on the physical position of an end of the released second waveguide portion relative to the coupler.

In furtherance of the one or more first embodiment, the photonic device comprises an optical coupler and a plurality of second waveguides. The released second waveguide portion is to undergo a physical displacement relative to the substrate and coupler sufficient to vary a coupling of the mode among the second waveguides.

In furtherance of the one or more first embodiment, the photonic device has a temperature dependence. The released second waveguide length is to undergo a degree of deflection relative to the substrate and photonic device to at least partially compensate the temperature dependence.

In furtherance of the one or more first embodiment, the photonic device comprises an optical coupler and a plurality of second waveguides, the optical coupler having a temperature dependent center frequency associated with the second waveguides and a launch point of the coupler. The released second waveguide length is to undergo a degree of displacement relative to the substrate sufficient to compensate the temperature dependence over a given temperature range by repositioning the launch point as a function of temperature.

In furtherance of the one or more first embodiment, the released second waveguide length comprises a first material. At least a portion of the released second waveguide length is asymmetrically clad with one or more second material to induce a deflection in the released second waveguide length relative to the substrate and the photonic device as a function of the first and second material temperature; or the released second waveguide length is further coupled to a microelectromechanical actuator disposed over a third region of the substrate.

In furtherance of the one or more first embodiment, the released second waveguide length comprises a first material; and wherein a lateral sidewall of at least a portion of the released second waveguide length is clad with one or more second material.

In furtherance of the one or more first embodiment, the PIC further includes a microelectromechanical actuator disposed over a third region of the substrate. The actuator further comprises a released capacitive member affixed to the released second waveguide length, and an anchored capacitive member affixed to the substrate and in spaced apart from the released capacitive member by a distance small enough to electrostatically couple to the released capacitive member in response to a drive voltage.

In furtherance of the one or more first embodiment, an end of the released second waveguide length is separated from the photonic device by a free-space gap having an integer multiple of one half a center frequency to be propagated by the input optical waveguide.

In furtherance of the one or more first embodiment, at least one of: an end facet of the at least one of the released second waveguide length or photonic device is angled non-orthogonally; or an antireflective coating (ARC) is disposed the end of the released second waveguide; or a point on the end of the released second waveguide length is spaced less than 1.0 µm apart from a point on the adjacent sidewall of the optical coupler.

In one or more second embodiment, a monolithic optical wavelength division multiplexer/de-multiplexer (WDM) includes a substrate, an optical coupler disposed over a first region of the substrate, and a first optical waveguide disposed over a second region of the substrate. A first end of the first waveguide is optically coupled to a first end of the optical coupler, and a plurality of second optical waveguides disposed over a third region of the substrate, wherein each of the plurality of second optical waveguides have a first end optically coupled to a second end of the optical coupler. At least one of the first waveguide ends is a released end that is separated from the substrate and from the optical coupler by a free-space gap.

In furtherance of the one or more second embodiment, the optical coupler, first optical waveguide, and second optical waveguides are crystalline silicon. The optical coupler comprises a planar waveguide and an Echelle grating or an arrayed waveguide grating (AWG). A first length of the waveguide with the released end is mechanically anchored to the substrate, and a second length of the waveguide with the released end is physically released from the substrate and separated from the optical coupler by the free space gap.

In furtherance of the one or more second embodiment, at least a portion of the second length is asymmetrically clad with one or more second material to induce a mechanical deflection along the second length relative to the substrate and to the optical coupler as a function of the difference between a coefficient of thermal expansion of the second material and the silicon waveguide.

In furtherance of the one or more second embodiment, the second length is further coupled to a microelectromechanical actuator disposed over a fourth region of the substrate.

In furtherance of the one or more second embodiment, at least one of: the released end and a nearest end facet of the optical coupler define a Fabry-Perot cavity dimensioned to an integer multiple of one half a center frequency to be propagated by the first optical waveguide; or an end facet of a released end or an end facet of the optical coupler is angled non-orthogonally; or an antireflective coating (ARC) is disposed the released end; or a point on the released end is spaced less than 1.0 µm apart from a nearest end facet of the optical coupler.

In one or more third embodiment, a PIC includes the optical WDM as in the one or more second embodiment, and a plurality of photodetectors or a plurality of lasers disposed over the substrate and optically coupled to second ends of the second optical waveguides.

In one or more fourth embodiment, an electronic device includes a processor, a memory, and an optical receiver module chip communicatively coupled to at least one of the processor and the memory. The optical receiver module further comprises the PIC of the one or more third embodiment.

In one or more fifth embodiment, a method of fabricating a photonic integrated circuit includes receiving a substrate having a semiconductor device layer disposed over a dielectric material layer. The method includes patterning the device layer into a photonic device intersecting an optical waveguide. The method includes forming a trench through the device layer between the end of the waveguide and the photonic device. The method includes removing a portion of the dielectric material layer, to fully undercut the transverse width along an end portion of the longitudinal length and mechanically release an end of the waveguide proximal the photonic device.

In furtherance of the one or more fifth embodiment, the method further includes forming a cladding material asymmetrically about the end portion. The cladding material has a coefficient of thermal expansion different than that of the device layer to induce a temperature-dependent deflection in the released end of the waveguide.

In furtherance of the one or more fifth embodiment, forming the cladding material further includes depositing on a first lateral sidewall of the end portion a metal layer of greater thickness than on a second lateral sidewall of the end portion opposite the first lateral sidewall.

In furtherance of the one or more fifth embodiment, forming the cladding material further includes depositing a dielectric layer between the metal layer and the first lateral sidewall.

In furtherance of the one or more fifth embodiment, the method further includes patterning the device layer into an electrostatic actuator physically coupled to the end portion of the longitudinal length.

It will be recognized that embodiments of the invention are not limited to the exemplary embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A monolithic photonic integrated circuit (PIC), comprising:
   a substrate;
   a photonic device over a first region of the substrate; and
   an optical waveguide over a second region of the substrate, wherein the optical waveguide further comprises:
   a substrate-anchored portion; and
   a released portion that is displaceable relative to the photonic device, wherein:
   the photonic device comprises an optical coupler and a plurality of second waveguides, the optical coupler having a center frequency associated with the second waveguides and a launch point of the coupler;
   the released waveguide portion is to undergo displacement relative to the photonic device sufficient to reposition the launch point;

the released waveguide portion comprises a first material; and a length of the released waveguide portion is asymmetrically clad with one or more second materials, at least one of which has a different coefficient of thermal expansion than the first material to induce a deflection in the released waveguide portion relative to the photonic device as a function of temperature.

2. The monolithic PIC of claim 1, wherein traversal of an optical mode through the coupler is dependent on a physical position of an end of the released waveguide portion relative to the coupler.

3. The monolithic PIC of claim 1, wherein:
the displacement is sufficient to vary a coupling of an optical mode among the second waveguides.

4. The monolithic PIC of claim 1, wherein:
the photonic device has a temperature dependence; and
the released waveguide portion is to undergo a degree of deflection relative to the photonic device as a result of the different coefficient of thermal expansion to at least partially compensate the temperature dependence.

5. The monolithic PIC of claim 4, wherein:
the center frequency associated with the second waveguides and the launch point of the coupler is temperature dependent; and
a degree of the displacement is to compensate a drift in the center frequency over a given temperature range by repositioning the launch point as a function of temperature.

6. The PIC of claim 1, wherein a lateral sidewall of the released waveguide portion is clad with the one or more second materials.

7. The PIC of claim 1, wherein an end of the released waveguide portion is separated from the photonic device by a free-space gap having an integer multiple of one half a center frequency to be propagated by the optical waveguide.

8. The PIC of claim 1, wherein at least one of:
an end facet of the at least one of the released waveguide portion or the photonic device is angled non-orthogonally to a longitudinal axis of the waveguide; or
an antireflective coating (ARC) is on an end facet of the at least one of the released waveguide portion; or
a point on an end facet of the released waveguide portion is spaced less than 1.0 µm apart from a point on the adjacent sidewall of the optical coupler.

9. An optical wavelength division multiplexer/de-multiplexer (WDM), comprising:
a substrate;
an optical coupler over a first region of the substrate;
a first optical waveguide over a second region of the substrate, wherein a first end of the first waveguide is optically coupled to a first end of the optical coupler,
a plurality of second optical waveguides over a third region of the substrate, wherein each of the plurality of second optical waveguides have a first end optically coupled to a second end of the optical coupler, and the optical coupler has a center frequency associated with the second waveguides and a launch point of the coupler; and
wherein:
at least one of the first waveguide ends is a released end that is cantilevered over the substrate and spaced apart from the optical coupler by a free-space gap;
the released end is to undergo displacement, relative to a length of the first waveguide that is mechanically anchored to the substrate, and relative to the coupler, sufficient to reposition the launch point;
the released waveguide portion comprises a first material; and
a length of the released waveguide portion is asymmetrically clad with one or more second materials, at least one of which has a different coefficient of thermal expansion than the first material to induce a deflection in the released waveguide portion relative to the photonic device as a function of temperature.

10. The monolithic WDM of claim 9, wherein:
the optical coupler comprises a planar waveguide and an Echelle grating or an arrayed waveguide grating (AWG).

11. The WDM of claim 10, wherein at least one of:
the released end and a nearest end facet of the optical coupler define a Fabry-Perot cavity dimensioned to an integer multiple of one half a center frequency to be propagated by the first waveguide; or
an end facet of the released end or an end facet of the optical coupler is angled non-orthogonally to a longitudinal axis of the first waveguide; or
an antireflective coating (ARC) is on an end facet of the released end; or
a point on an end facet of the released end is spaced less than 1.0 µm apart from a nearest end facet of the optical coupler.

12. A PIC, comprising:
the optical WDM of claim 9; and
a plurality of photodetectors or a plurality of lasers over the substrate and optically coupled to second ends of the second optical waveguides.

13. An electronic device, comprising:
a processor;
a memory; and
an optical receiver module chip communicatively coupled to at least one of the processor and the memory, wherein the optical receiver module further comprises a monolithic optical wavelength division multiplexer/de-multiplexer (WDM), further comprising:
a substrate;
an optical coupler over a first region of the substrate;
a first optical waveguide over a second region of the substrate, wherein a first end of the first waveguide is optically coupled to a first end of the optical coupler,
a plurality of second optical waveguides over a third region of the substrate, wherein each of the plurality of second optical waveguides have a first end optically coupled to a second end of the optical coupler, and the optical coupler has a center frequency associated with the second waveguides and a launch point of the coupler; and
wherein:
at least one of the first waveguide ends is a released end that is cantilevered over the substrate and spaced apart from the optical coupler by a free-space gap;
the released end is to undergo displacement, relative to a length of the first waveguide that is mechanically anchored to the substrate, and relative to the coupler, sufficient to reposition the launch point;
the released waveguide portion comprises a first material; and
a length of the released waveguide portion is asymmetrically clad with one or more second materials, at least one of which has a different coefficient of thermal expansion than the first material to induce a deflection in the released waveguide portion relative to the photonic device as a function of temperature; and a plurality of photodetectors or a plurality of lasers over the substrate and optically coupled to second ends of the second optical waveguides.

14. The PIC of claim 1, wherein:

a lateral sidewall of the first material along at least a portion of a first side of the released waveguide length is covered with the second material to a greater extent than is a lateral sidewall of the first material along the portion of a second side of the released waveguide length, opposite the first side; and the deflection is within a plane of the substrate.

15. The PIC of claim 14, wherein the second material is substantially absent from the second side of the released waveguide length.

16. The PIC of claim 1, wherein the second material is separated from the first material by an intervening third material, the third material having a refractive index contrast with the first material to reduce optical mode scattering by the second material.

17. The PIC of claim 16, wherein the first material comprises silicon, the second material comprises a metal, and the third material comprises silicon and at least one of oxygen or nitrogen.

18. The PIC of claim 17, wherein the second material comprises aluminum.

19. The PIC of claim 18, wherein the first material comprises substantially only silicon, and the third material comprises predominantly silicon and nitrogen.

20. The optical WDM of claim 10, wherein:

a lateral sidewall of the first material along at least a portion of a first side of the length of the released waveguide is covered with the second material to a greater extent than is a lateral sidewall of the first material along a second side of the portion of the released waveguide length, opposite the first side; and the deflection is within a plane of the substrate.

21. The optical WDM of claim 20, wherein the second material is substantially absent from the second side of the length of the released waveguide.

22. The optical WDM of claim 20, wherein the second material is separated from the first material by an intervening third material, the third material having a refractive index contrast with the first material to reduce optical mode scattering by the second material.

23. The optical WDM of claim 22, wherein the first material comprises silicon, the second material comprises a metal, and the third material comprises silicon and at least one of oxygen or nitrogen.

24. The optical WDM of claim 23, wherein the second material comprises aluminum.

25. The optical WDM of claim 24, wherein the first material comprises substantially only silicon, and the third material comprises predominantly silicon and nitrogen.

* * * * *